UNITED STATES PATENT OFFICE.

ALBERT D. CHASE, OF SEA CLIFF, NEW YORK.

IMPROVEMENT IN FRUIT-JELLIES.

Specification forming part of Letters Patent No. 156,876, dated November 17, 1874; application filed August 26, 1874.

*To all whom it may concern:*

Be it known that I, ALBERT D. CHASE, of Sea Cliff, Kings county, in the State of New York, have invented an Improvement in Fruit-Jelly, of which the following is a specification:

It is well known to those skilled in the art of making jelly from the juice of fruit that the drying of the fruit before extracting its jellifiable juices greatly improves the jelly, giving to it a firmer consistency, a clearer and more completely jellified structure, and the capacity to endure handling and transportation, change of temperature, and exposure to the air without liquefying or becoming otherwise deteriorated in quality, it being more difficult to make jelly of the juice of green fruit, and the jelly when made having a more granular structure, being more readily "broken down" and reduced to a semi-fluid by agitation, and more susceptible to the deteriorating action of the atmosphere; but the manufacture of jelly from dried fruit is necessarily attended with more expense than from green fruit, as it involves the extra labor and cost of preparing and drying the fruit, and the loss which often occurs in the decay of more or less of the fruit in the process; besides, the extracting of the juices from green fruit is more easily and cheaply effected than from dried. For these reasons it is highly desirable to dispense as far as possible with the preliminary operation of drying; and I have discovered that in making jelly, when to the juices of green fruit are added about equal parts of these of the same fruit dried, a jelly is produced that has the same good qualities of consistency, a clear jellified structure, capacity to endure high temperature, handling, and transportation, or other agitation, without deterioration, existing in that made from dried fruit alone, the juice of dried fruit when mingled with that of green fruit seeming to propagate in the latter its own jellifying properties. It is not diluted by the green-fruit juice, but reacts upon it to produce in the mixture the same properties and conditions possessed by itself alone.

The advantages of thus being able to utilize the juices of green fruit are obvious. Only one-half or less of the fruit intended for jelly needs to be dried, thus saving one-half of the labor and expense necessarily incurred when the entire fruit is dried, while the preservation of the entire fruit intended to be used is as effectually accomplished as by drying it all, the method being to extract the juices from the green fruit as it is gathered in the autumn, and immediately (adding sufficient sugar) boil it down to nearly a jelly, in which state it may be kept undeteriorated for months; then, as the manufacturing during the year goes on, the juices of dried fruit are mixed with it, and the mass evaporated to a jelly, completing the process.

My invention consists in the method above indicated of making jelly from the juice of green fruit by mingling with it a portion of the juice expressed from dried fruit, whereby there is produced a jelly having the superior qualities, above specified, of that made from dried fruit alone.

In practicing my method, I extract from fruit that has been well dried, by any of the modes in use, its juices. The preferable mode is to add to the fruit as much water as it will absorb, raise the temperature to about 90° or 100° Fahrenheit, and let it stand for about an hour; then add about half as much more water, and raise the temperature to about 180° or 190°, and hold it at that temperature about one hour more; then draw off the surplus fluid from the bottom, and pour it upon the top, doing this repeatedly until by such repeated leaching the jellifiable properties of the fruit are completely dissolved; then subject the mass of solid matter to pressure, and express the liquid it contains as completely as possible. The juice of the green fruit may be extracted, in the usual way, by macerating it in a small quantity of water, and its own juices at a temperature somewhat below boiling for a suitable time, and then separating the fluid by pressure. I then mix the two fluids, preferably in the proportion of three parts of the juice of the dried fruit to two parts of that of the green fruit, add the proper quantity of sugar, and evaporate until the mass is properly jellified. The evaporation required is about the same as is necessary with the juice of dried fruit alone.

In place of putting the juices of the dried and green fruit together before evaporation, that of the green fruit may be evaporated separately, with the sugar added that may be necessary for its preservation, and kept for use as it may be required, and then when desired for use the juice from dried fruit may be extracted, as before described, and added, and the whole evaporated to a jelly.

The jelly thus produced, in addition to the superior properties hereinbefore specified, has a more agreeable fruit flavor than that made from the juice of green dried fruit alone.

What I claim as my invention, and desire to secure by Letters Patent, is—

As a composition of matter, fruit-jelly composed of the juices of dried fruit and of green fruit, mingled and solidified as described.

Witness my hand this 20th day of August, 1874.

Witnesses:

ALBERT D. CHASE.

B. S. CLARK,
J. P. FITCH.